United States Patent
Marn et al.

(10) Patent No.: US 8,567,744 B1
(45) Date of Patent: Oct. 29, 2013

(54) REUSABLE BREAKAWAY MOUNTING DEVICE

(75) Inventors: William H. Marn, San Diego, CA (US); Brandon J. Wiedemeier, San Diego, CA (US)

(73) Assignee: The United States of America, as Represented by the Secretary of the Navy, Washington, DC (US)

( * ) Notice: Subject to any disclaimer, the term of this patent is extended or adjusted under 35 U.S.C. 154(b) by 12 days.

(21) Appl. No.: 13/342,348

(22) Filed: Jan. 3, 2012

(51) Int. Cl.
*F16M 13/00* (2006.01)
*A47G 1/17* (2006.01)
*F16B 5/00* (2006.01)

(52) U.S. Cl.
USPC ............ 248/548; 248/206.5; 248/309.4; 403/335

(58) Field of Classification Search
USPC ........... 248/548, 549, 346.01, 346.04, 346.5, 248/900; 285/9.1, 92; 403/2, 200, 370, 343
See application file for complete search history.

(56) References Cited

U.S. PATENT DOCUMENTS

| | | | |
|---|---|---|---|
| 7,544,008 B2* | 6/2009 | Johansson et al. | 403/337 |
| 2009/0146412 A1* | 6/2009 | Schoenoff et al. | 285/9.1 |

* cited by examiner

*Primary Examiner* — Jonathan Liu
*Assistant Examiner* — Taylor Morris
(74) *Attorney, Agent, or Firm* — Arthur K. Samora; Kyle Eppele

(57) ABSTRACT

A reusable device for detachably mounting an object to a platform includes a breakaway plate that is mounted to the object and a mounting bracket that is fixed to the platform. The breakaway plate is formed with a circumferential groove, and an o-ring is placed in the groove. A tooth ring having a slight gap is positioned over the o-ring. As a retaining ring is placed over the o-ring and tooth ring and fastened to the mounting bracket, the tooth ring compresses, which causes the o-ring to compress and engage the tooth ring at a breakaway force of the object. When an applied force that is greater than the breakaway force is applied to the object, the o-ring pops out to separate the object and platform. The o-ring durometer is chosen according to the magnitude of breakaway force that is desired by the user.

12 Claims, 9 Drawing Sheets

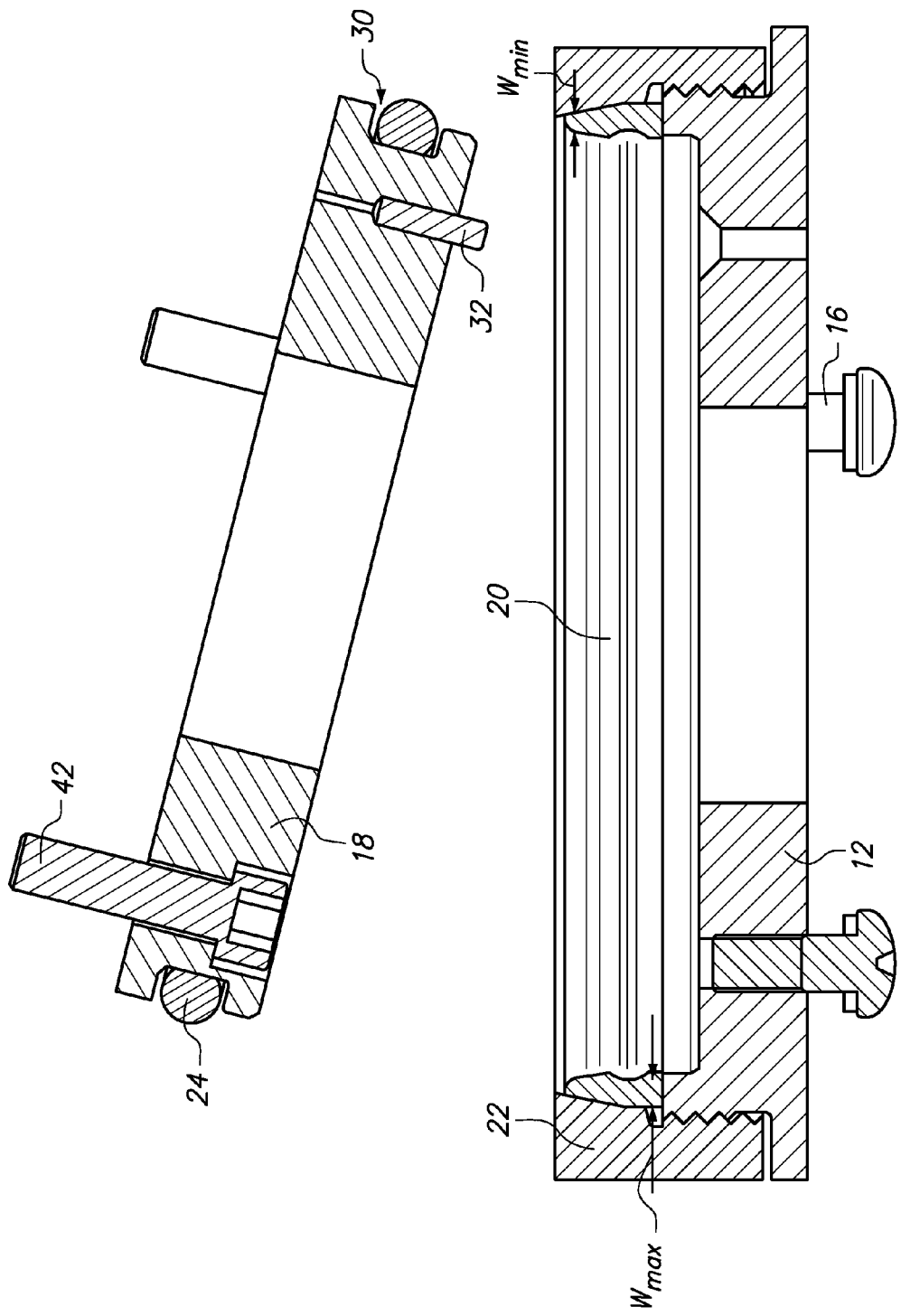

REUSABLE BREAKAWAY MOUNTING DEVICE

FEDERALLY-SPONSORED RESEARCH AND DEVELOPMENT

This invention (Navy Case No. 101064) is assigned to the United States Government and is available for licensing for commercial purposes. Licensing and technical inquires may be directed to the Office of Research and Technical Applications, Space and Naval Warfare Systems Center, Pacific, Code 72120, San Diego, Calif. 92152; voicemail (619) 553-5118; email ssc pac T2@navy.mil.

FIELD OF THE INVENTION

The present invention pertains generally to mounting devices. More particularly, the present invention pertains to a resettable mounting device for mounting a high value object to a platform, which detaches the high value object from the platform when sufficient force is applied to the object, in order to prevent damage to the object or the platform, but which can be reset and reused without having to replace any components on the device.

BACKGROUND OF THE INVENTION

Breakaway devices are well known in the prior art for preventing damage to high value objects. Such devices are usually designed so that when the forces on the object reach sufficient levels, the device "breaks" and high value object falls away from the larger system. If the breakaway force is designed to be less than the strength of the high value object materials, damage to the high value object is prevented.

The breakaway devices in the known art that could act in a similar manner to prevent damage to high value objects, however, have limitations and disadvantages. Specifically, there are several designs that exist which have relatively defined, uniform breaking strengths, such as breakaway bolts, shear pins, and the like. However, detachment systems using these components have the disadvantage of needing to be replaced after "breaking".

Other types of temporary mounting devices could be considered to perform the same task, such as hook and loop fabric, re-adhering adhesive, or tab and slot rubber mounting devices. But these systems typically do not offer as much angular stability or provide sufficient stability for heavy duty applications. In the case of adhesives and rubber mountings, these systems could not be used for underwater environments and similar types of applications. Still other breakaway systems can include a, spring loaded or hinged base, which could bend out of the way at a predetermined force, which would again be less than the material strength of the high value object. But a system of this type may not be as compact as the user might desire. Still another variation could be to use an electromagnet or have an electro mechanical pin that retracts to provide the release. But these types of systems have the disadvantage of complexity and the requirement of a power source to selectively activate the electromagnetic pin.

In view of the above, it is an object of the present invention to provide a detachable, reusable mounting device that is reusable, resettable, stable and compact. Yet another object of the present invention is to provide a detachable, reusable mounting device that does not require replacement of parts after operation of the device. Still another object of the present invention is to provide a detachable, reusable mounting device allows for angular force stability in heavy duty applications. Another object of the present invention is to provide a detachable, reusable mounting device that is stable and reliable in an underwater environment. Still another object of the present invention is to provide a detachable, reusable mounting device that is simple, reliable and inexpensive to implement.

SUMMARY OF THE INVENTION

A reusable device for detachably mounting a high value object to a platform can include a breakaway plate that can be mounted to the high value object and a mounting bracket that can be fixed to the platform. A disengagement means can be fixed to the breakaway plate and to the mounting bracket in a manner which can cause the high value object to separate from the platform when a force is applied to the high value object. To do this, the disengagement means can interconnect the high value object to the platform with a breakaway force that can be less than an applied force which would damage the object or the platform.

In several embodiments, the breakaway plate can be formed with a circumferential groove, and an o-ring can be placed in the circumferential groove. A flexible tooth ring can be formed with ends that have a slight gap, and the tooth ring can be positioned over the o-ring. A retaining ring can be placed over the o-ring and tooth ring and can be fastened to the mounting bracket. As the retaining cap is fastened to the mounting bracket, the tooth ring can compress to cause the tooth ring ends to move towards each other, which can cause the o-ring to compress and conform to the interior annular surface of the tooth ring and thereby engage the tooth ring to establish the breakaway force when the retaining ring is fastened to the mounting bracket.

The tooth ring can be formed with a decreasing taper when viewed in cross-section, from a maximum width proximate to the mounting bracket to a minimum width distal to said mounting bracket. The tooth ring taper can also assist in keeping the tooth ring in place during operation of the device. Different o-rings having different durometers can also be chosen to cause the breakaway plate to disengage from the mounting bracket at a breakaway force that is desired by the user. As the breakaway force (the force of the o-ring against the tooth ring) is overcome, the o-ring slips out of the tooth ring and the high value object becomes separated from the platform. To reset the device, the retaining ring can be unthreaded, a different o-ring can optionally be placed in the circumferential groove, and the breakaway plate can be placed in contact with the mounting bracket. The tooth ring can be positioned over the o-ring and the retaining ring can be positioned over the tooth ring and o-ring, and re-fastened to the mounting bracket.

In other embodiments of the invention, a first plurality of magnets can be attached to the breakaway plate and a second plurality of magnets can be attached to the mounting bracket. The magnets in the first plurality and in the second plurality cooperate to establishing a magnetic force which functions as the breakaway force that must be overcome by an applied force in order for the breakaway plate to disengage from the mounting bracket. The number and magnetic strength of magnets for the first plurality and the second plurality are chosen according to the size of the breakaway force that is desired to be established by a user.

BRIEF DESCRIPTION OF THE DRAWINGS

The novel features of the present invention will be best understood from the accompanying drawings, taken in conjunction with the accompanying description, in which similarly-referenced characters refer to similarly-referenced parts, and in which.

DETAILED DESCRIPTION OF THE EMBODIMENTS

Figure 1:
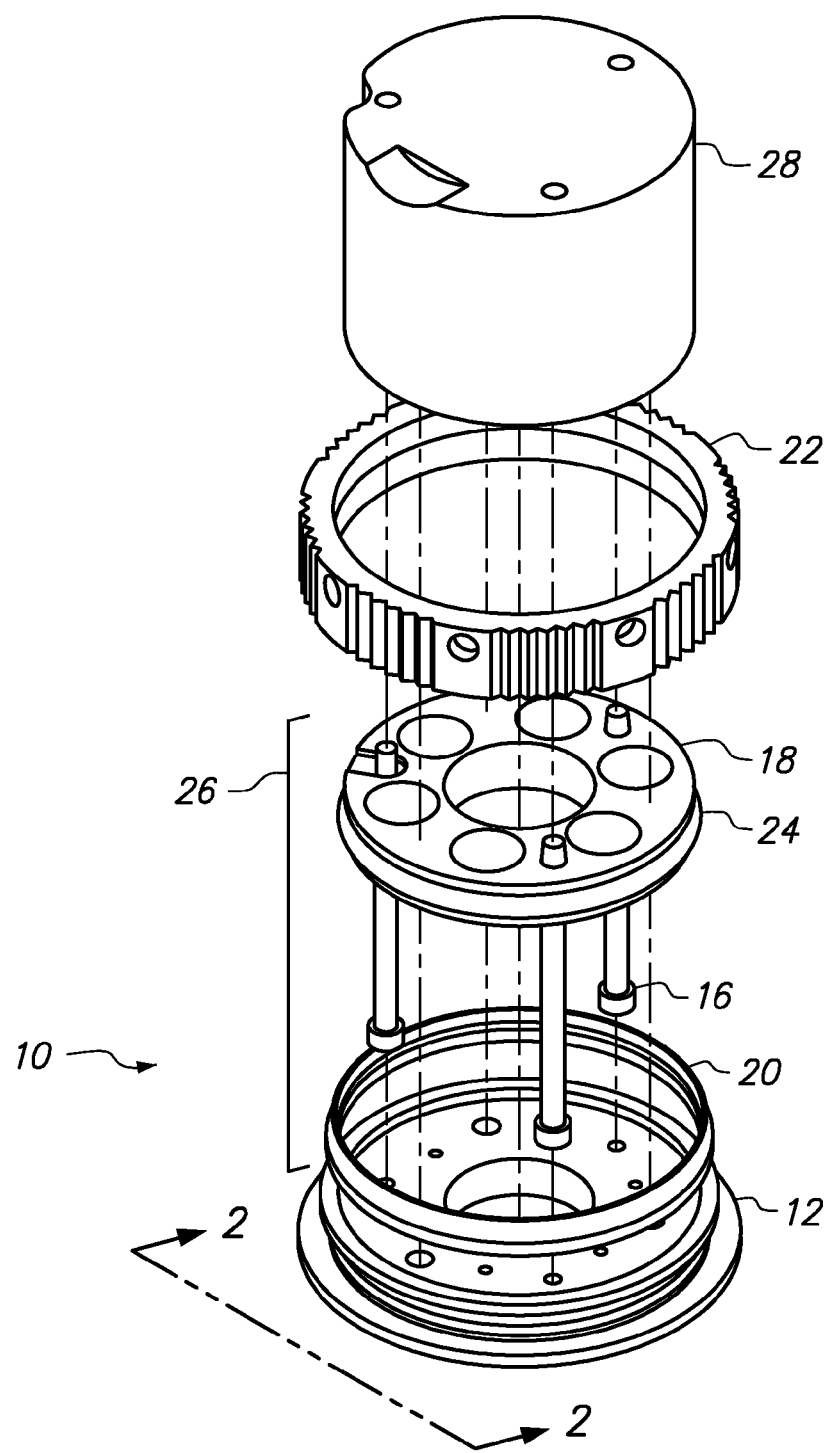
FIG. 1 is an exploded side elevational view of the reusable breakaway mounting device according to several embodiments of the present invention.
Figure 2:
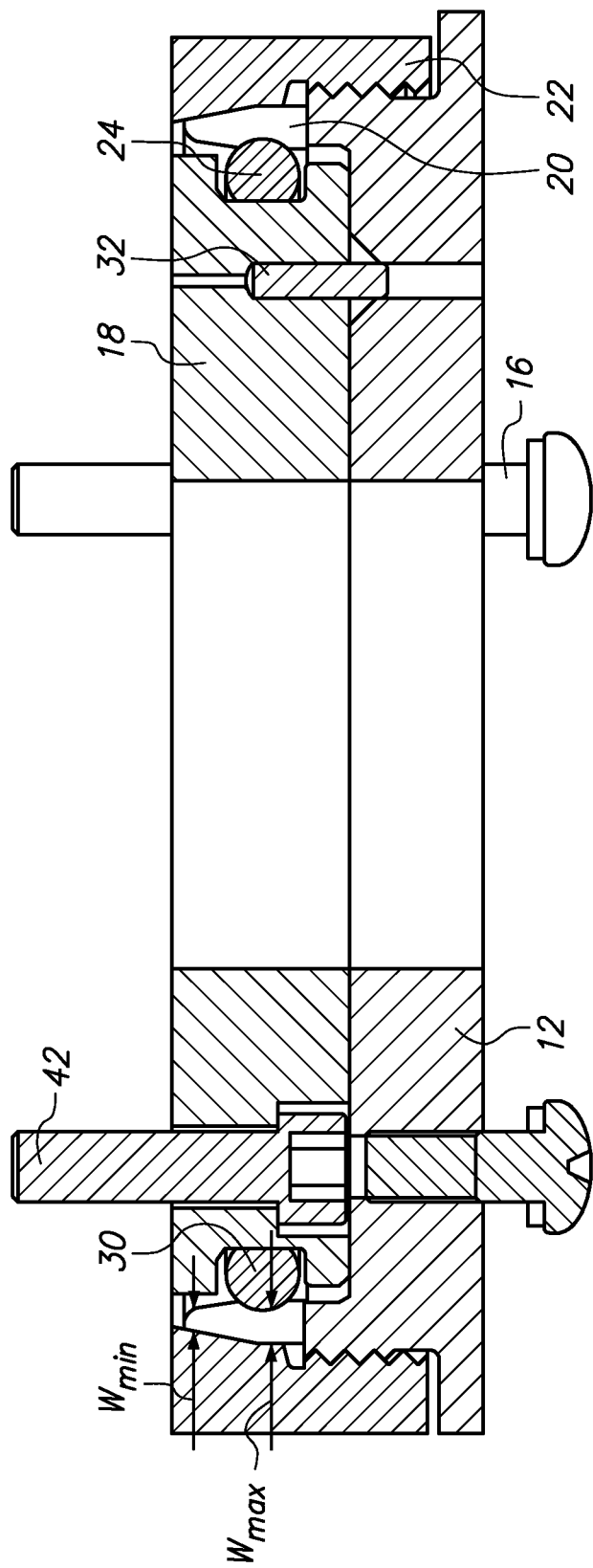
FIG. 2 is a cross-sectional view of the device of FIG. 2 taken along line 2-2 in FIG. 1, but with the high value object removed for greater clarity.

Referring initially to FIGS. 1 and 2, a reusable breakaway mounting device according to several embodiments of the present invention can be shown and can be generally designated by reference character 10. As shown, device 10 can include a mounting bracket 12 that can be fixed to a base 14, platform or similar type of corresponding structure (see FIGS. 4 and 7) with fasteners 16. Base 14 can be further attached to a larger platform or overall system (not shown). Device 10 can further include a breakaway plate 18, a tooth ring 20 and a retaining cap 22. The breakaway plate 18 and tooth ring 20, when considered along with o-ring 24, can be defined as a resettable disengagement means 26 for the device, according to some embodiments. A high value object 28 can be fastened to breakaway plate 18 with high value object fasteners 42 (FIG. 2). The manner in which the disengagement means 26 can be operated and then reset to protect high value object 28 can be described more fully below.

As shown in FIG. 2, the breakaway plate 18 portion of disengagement means 26 can be formed with a circumferential groove 30. The high value object 28 (not shown in FIG. 2, please see FIG. 4) can be fixed to breakaway plate 18 with high value object fasteners 42, and breakaway plate 18 can be positioned in contact with mounting bracket 12 using alignment pins 32. The o-ring 24 can be positioned in circumferential groove 30, and tooth ring 20 can be positioned over o-ring 24 so that it surrounds o-ring 24. Retaining cap 22 can be positioned over tooth ring 20 and threaded onto mounting bracket 12 (although retaining cap 22 can be fastened to mounting bracket 12 via other methods as known in the art).

Figure 3:
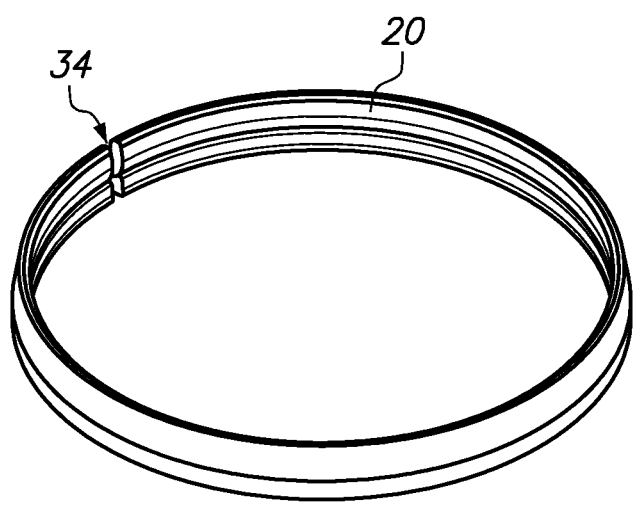
FIG. 3 is a side elevational view of the tooth ring of the device in FIG. 1.

As shown in FIG. 3, tooth ring 20 is formed with a gap 34, and as retaining cap 22 is threaded onto mounting bracket, tooth ring compresses to close gap 34. As tooth ring 20 compresses, o-ring 24, which is made of a resilient material, compresses to establish a reactive spring force $F_{SPRING}$ of o-ring 24 against tooth ring 20 ($F_{SPRING}$ can be considered as a breakaway force which, when overcome, can cause o-ring 24 to disengage from tooth ring 20). The reactive spring force $F_{SPRING}$ is shown in greater detail in FIG. 4. To facilitate the compression, tooth ring can further be formed with a decreasing taper when viewed in cross-section, from a maximum width $w_{max}$ proximate to a minimum width $w_{min}$ at the most distal point of tooth ring 20 with respect to mounting bracket 12.

Figure 4:
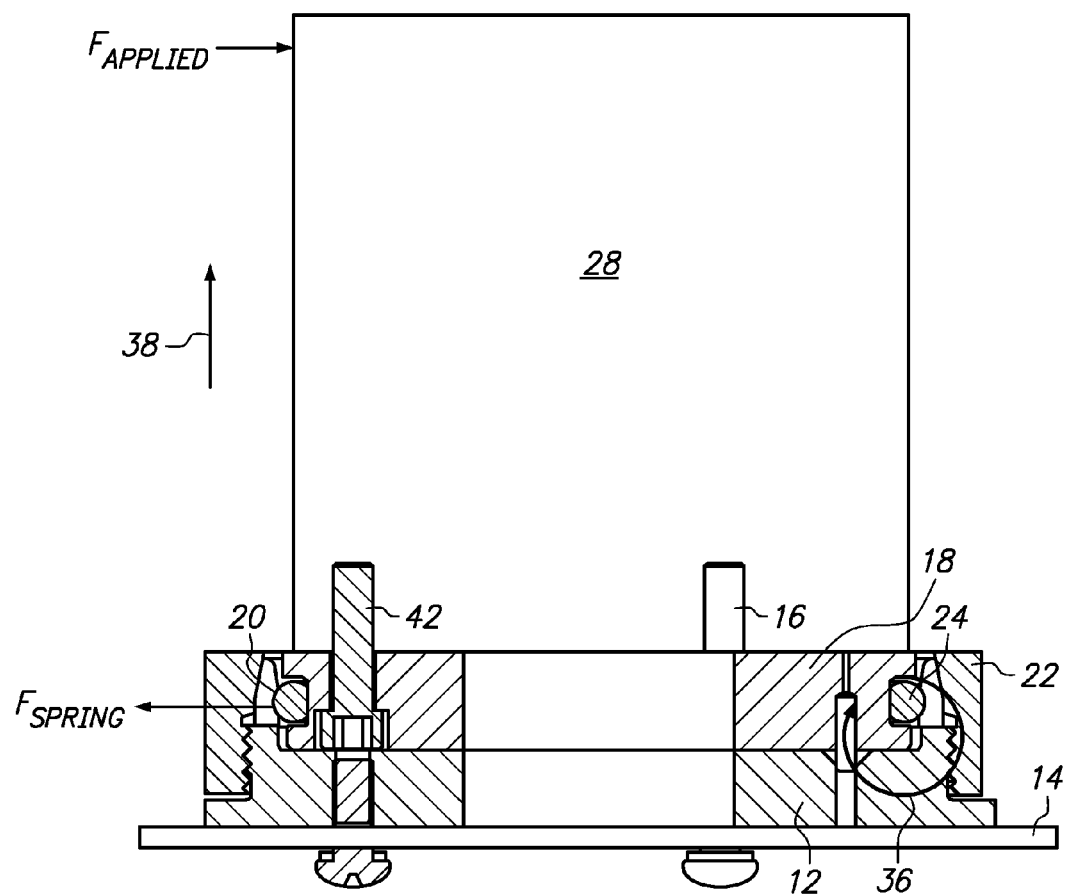
FIG. 4 is the same view as FIG. 2, but with the high value object shown to illustrate the forces that can occur during operation of the device of FIG. 1.

As shown in FIG. 4, an applied force $F_{APPLIED}$ can be established on high value object 28 due to striking of high value object against another object (not shown), for example. As long as the magnitude of is $F_{APPLIED}$ is less than the magnitude of $F_{SPRING}$, the o-ring 24 will remain engaged against tooth ring. But once $F_{APPLIED}$ becomes sufficient to overcome $F_{SPRING}$, the o-ring 24 can disengage from tooth ring 20 by pivoting around arrow 36. Alternatively, the high value object 28 may be pulled directly out if $F_{APPLIED}$ is exerted on high value object 28 in the direction shown by arrow 38. This can cause the $F_{APPLIED}$ to be applied along the entire o-ring 24, and would further cause o-ring 24 to disengage tooth ring by moving in the direction indicated by arrow 38, as opposed to the pivoting movement indicated by arrow 36.

All o-rings 24 can have a durometer, which is understood herein to be a measure of resistance of the o-ring 24 to indentation, as measured by a Shore® (Durometer) test, Rockwell hardness test, or any other similar type of test that is known in the art. The durometer of the o-ring can be chosen according to the magnitude of the reactive spring force $F_{SPRING}$ that is desired. For several embodiments, the o-ring durometer can be chosen so that it is less than an applied force $F_{APPLIED}$ that would damage the high value object 28. Stated differently, the o-ring 24 resiliency can be chosen to cause the o-ring 24 to pop out from the tooth ring 20 in response to an applied force $F_{APPLIED}$, but before that applied force $F_{APPLIED}$ can cause damage the high value object 28. A tether (not shown) can be attached to high value object 28 and to mounting bracket 12 or the larger platform/structure (not shown) that bracket 12 is attached to, so that high value object 28 does not become lost if it does become disengaged from the overall platform.

FIG. 10 illustrates the structure and cooperation of structure after operation of the device 10 according to several embodiments. As shown, o-ring 24 of device 10 has "popped" free of tooth ring 20, but remains within circumferential groove 30. Breakaway plate 18 remains fasted to high value object 28, while tooth ring 20 remains encircled by retaining ring 22, which further remains fastened to mounting bracket 12. To reset the device 10, the retaining cap 22 can be removed (unscrewed) from mounting bracket 12. The operator can choose the desired retaining force $F_{SPRING}$ that is needed and select an appropriate o-ring 24 as necessary (or simply re-using the same o-ring 24). Breakaway plate 18 can be placed back on mounting bracket using alignment pins 32 as described above. Tooth ring 20 can then be placed in a surrounding relationship to o-ring 24, and retaining cap 22 can be re-threaded onto mounting bracket 12.

Figure 5:
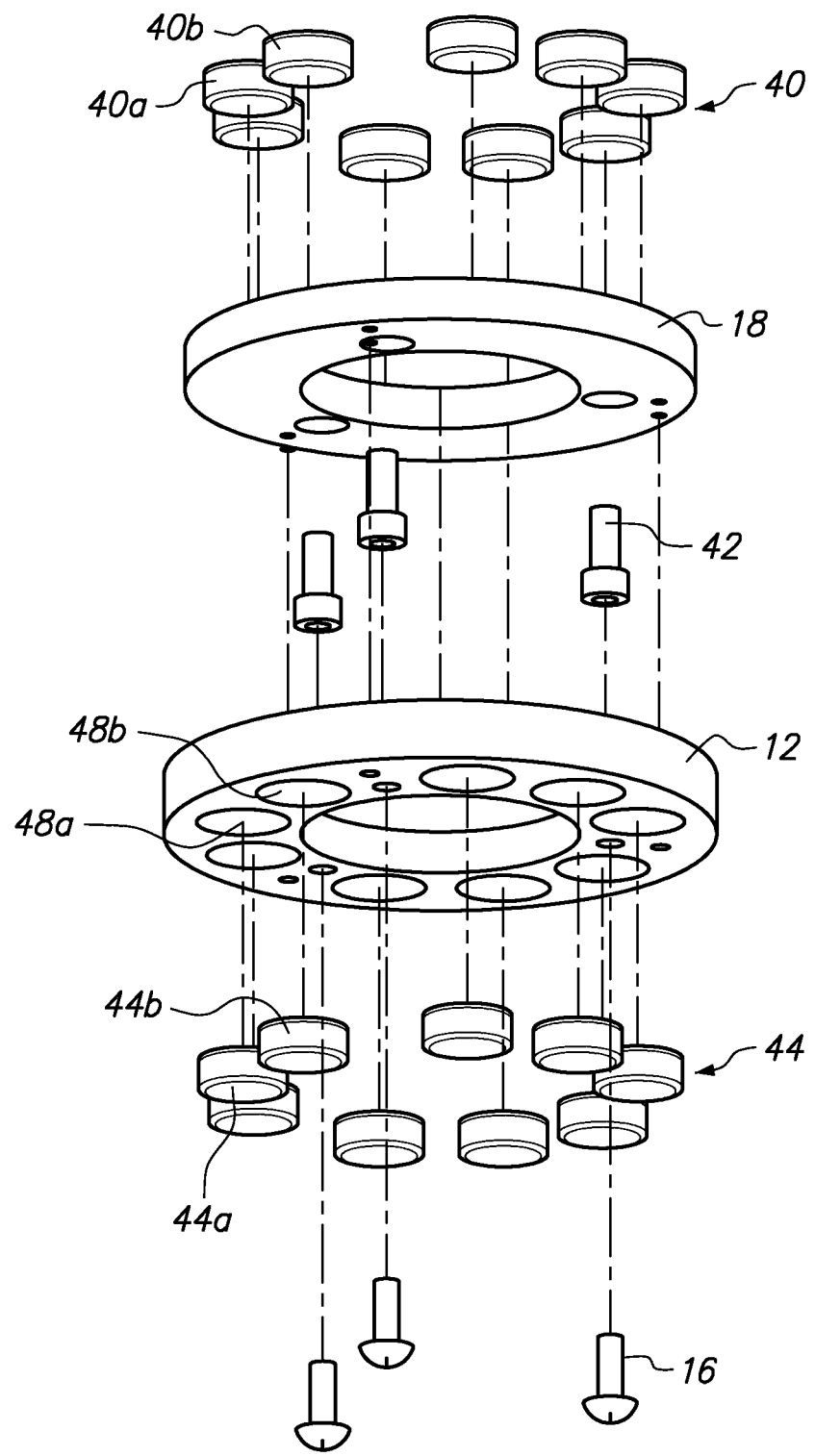
FIG. 5 is an exploded side elevational of view of the breakaway plate and mounting bracket portions of the device of FIG. 1 according to several alternative embodiments of the present invention.
Figure 6:
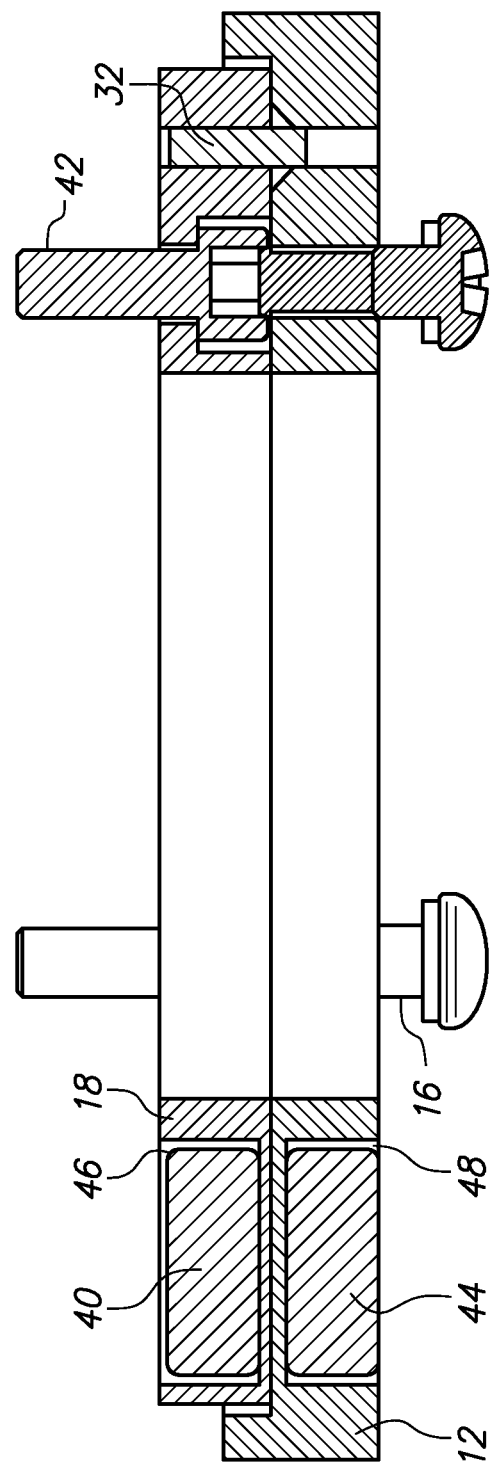
FIG. 6 is the same cross-sectional view of the device as FIG. 2, but with alternative embodiments of the breakaway plate and mounting bracket of FIG. 5 shown in greater clarity.

Referring now to FIGS. 5 and 6, alternative embodiments of the breakaway plate 18 and mounting bracket 12 for the disengagement means 26 can be shown. As shown, breakaway plate 18 can include a first plurality of magnets 40, of which magnets 40a and 40b are representative. Each magnet from first plurality 40 can be inserted into a respective plate recess 46 (see FIG. 6) and fasted to breakaway plate 16 in any manner known in the prior art, such as adhesives, fasteners, and the like. In similar fashion, a second plurality of magnets 44, of which magnets 44a and 44b are representative, can be inserted into corresponding bracket recesses 48 (see bracket recesses 48a and 48b in FIG. 5) and can be fastened to mounting bracket 12.

Figure 7:
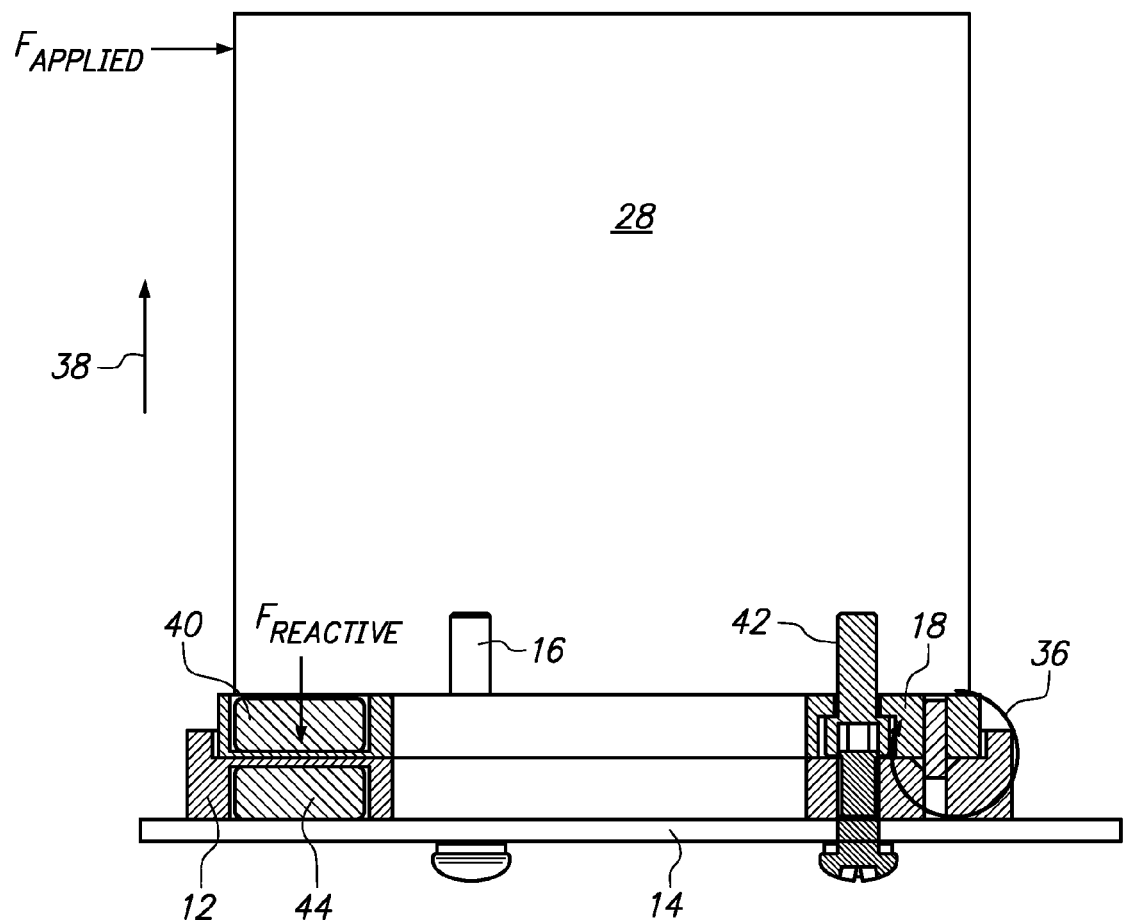
FIG. 7 is the same view as FIG. 6, but with the high value object shown to illustrate the forces that can occur during operation of the device of FIG. 5.

As shown in FIG. 7, for several alternative embodiments of the present invention, first plurality of magnets 40 and second plurality of magnets 44 can cooperate to establish a reactive force $F_{REACTIVE}$, which is equal to the sum of attractive forces of each magnet from the first plurality of magnets 40 with its respective counterpart from the second plurality of magnets 44. This reactive force $F_{REACTIVE}$ keeps high value object 28 "fastened" to base 14. However, as with the other embodiments, once an applied $F_{APPLIED}$ is applied to high value object 28 that is sufficient to overcome the reactive force $F_{REACTIVE}$, breakaway plate 18 (and high value object 28, which is fastened to breakaway plate 18 with high value object fasteners 42) will separate form mounting bracket 12 (and corresponding base 14). As with the other embodiments, the number and magnetic strength of the first plurality of magnets 40 and second plurality 44 of magnets can be chosen according to the user's needs, i.e. how strong a reactive force $F_{REACTIVE}$ is desired.

Figure 8:
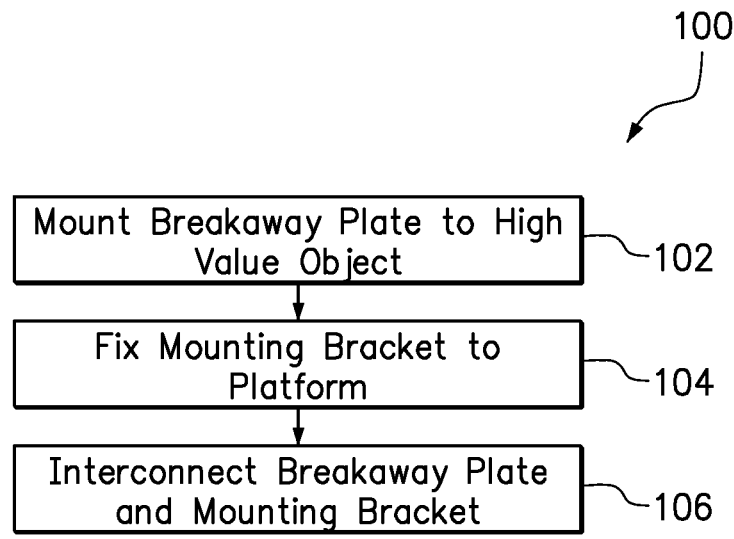
FIG. 8 is a block diagram which illustrates the steps that can be taken to accomplish the methods according to several embodiments of the present invention.

Referring now to FIG. 8, a method 100 for accomplishing the methods according to several embodiments can be depicted. As shown in FIG. 8, method 100 can include an initial step 102 of mounting a breakaway plate 18 to a high value object 28 that is to be protected. Method 100 can further include the step of fixing a mounting bracket 12 to a base 14 or similar type of overall structure. Next, the breakaway plate 18 and mounting bracket 12 can be interconnected with a disengagement means, as indicated by step 106.

Figure 9:
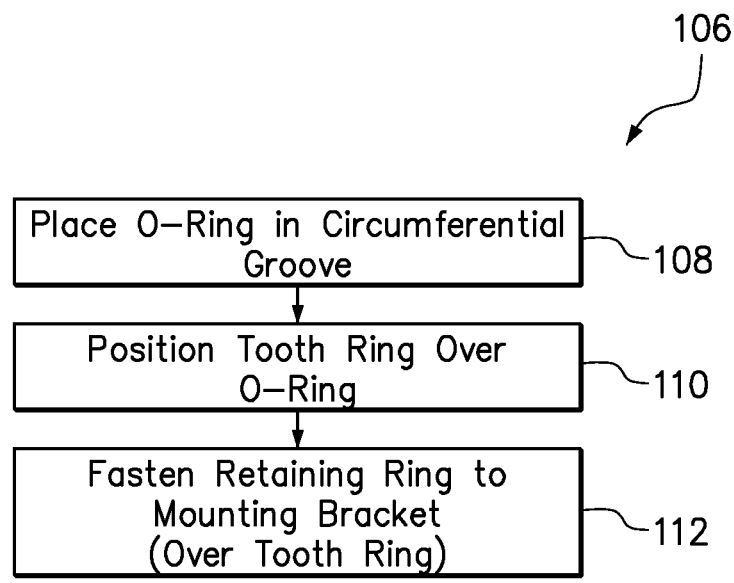
FIG. 9 is a block diagram, which shows additional steps that can be taken to accomplish the interconnecting step for the methods depicted in FIG. 8; and, FIG. 10 is the same view as FIG. 2 after the device has operated, which shows the manner in which the disengagement means of the device according to several embodiments can function to protect high value objects.

In FIG. 9, the interconnecting step 106 is shown in greater detail. More specifically, the interconnecting step 106 can further include the step 108 of placing an o-ring 24 in a circumferential groove 30, which has been formed in a breakaway plate 18. Interconnect step 106 can further include the step 110 of placing the aforementioned tooth ring 20 over o-ring 24, and then fastening retaining ring 22 to mounting bracket 12, as indicated by step 112. Once this occurs, the o-ring 24 compresses to thereby form a reactive force $F_{REACTIVE}$ against tooth ring 22 that must overcome for the breakaway plate 18 to disengage and separate from mounting bracket 12, as described above.

The use of the terms "a" and "an" and "the" and similar references in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of any ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A device for detachably mounting a high value object to a platform, said high value object having a damaging force, said device comprising:
    a breakaway plate mounted to said high value object, wherein said breakaway plate is formed with a circumferential groove in its outer periphery;
    a mounting bracket fixed to said platform; and,
    a disengagement means interconnecting said breakaway plate and said mounting bracket at a breakaway force, wherein said disengagement means further comprises: an o-ring placed in said circumferential groove; a tooth ring positioned over said o-ring and around said breakaway plate; and, a retaining ring positioned over said tooth ring and fastened to said mounting bracket, said o-ring engaging said tooth ring to establish said breakaway force when said retaining ring is fastened to said mounting bracket; said disengagement means causing said high value object to pivot away from said platform when an applied force that is perpendicular to and greater than said breakaway force, but less than said damaging force, is applied to said high value object.

2. The device of claim 1, wherein said mounting bracket and said retaining ring are both threaded to allow said retaining ring to be threaded onto said mounting bracket, and further wherein said retaining ring and said mounting bracket enclose said breakaway plate when said retaining ring is fastened to said mounting bracket.

3. The device of claim 1, wherein said tooth ring is formed with ends that define a gap, and further wherein said tooth ring compresses to move said ends towards each other when said retaining ring is fastened to said mounting bracket.

4. The device of claim 3, wherein said tooth ring has a decreasing taper when viewed in cross-section, from a maximum width $w_{max}$ proximate said mounting bracket to a minimum width $w_{min}$ distal to said mounting bracket.

5. The device of claim 1, wherein said o-ring has a durometer rating, and said durometer rating is selected, according to said breakaway force as desired by a user.

6. The device of claim 1, wherein said disengagement means further comprises a first plurality of magnets attached to said breakaway plate and a second plurality of magnets attached to said mounting bracket, said first plurality and said second plurality cooperating to establishing said breakaway force.

7. The device of claim 6, wherein the number of said magnets from said first plurality and said second plurality are chosen according to a desired said breakaway force as determined by a user.

8. A method for detachably mounting a high value object to a platform, comprising the steps of:
- A) mounting a breakaway plate to said high value object and forming a circumferential groove in the outer radial periphery of said breakaway plate;
- B) fixing a mounting bracket to said platform; and,
- C) interconnecting said breakaway plate and said mounting bracket at a breakaway force with a disengagement means by:
  - C1) placing an o-ring in said circumferential groove;
  - C2) positioning a flexible tooth ring with a gap formed therein over said o-ring and around said outer radial periphery; and,
  - C3) fastening a retaining ring to said mounting bracket so that said retaining ring surrounds said tooth ring, and so that said o-ring frictionally engages said tooth ring to establish said breakaway force when said step C) is accomplished;
- said disengagement means causing said breakaway plate to pivot away from said mounting bracket when an applied force that is perpendicular to and greater than said breakaway force, but less than a damaging force for said high value object, is applied to said high value object.

9. The method of claim 8, wherein said mounting bracket and said retaining ring are threaded and wherein said step C3) is accomplished using by threading said retaining ring onto said amounting bracket so that said retaining ring and said mounting bracket cooperate to enclose said breakaway plate.

10. The method of claim 8, wherein said step C3) is accomplished using a tooth ring that is formed with ends that define a gap, so that said tooth ring compresses and said ends move towards each other when said step C3) is accomplished.

11. The method of claim 10 wherein said step C) further comprises the step of:
- C4) forming said tooth ring with a decreasing taper when viewed in cross-section, from a maximum width proximate said mounting bracket to a minimum width distal to said mounting bracket.

12. The method of claim 8, wherein said step C1) is accomplished using an o-ring having a durometer rating, and further comprising the step of:
- D) selecting a said durometer rating for said o-ring according to a magnitude of said breakaway force desired.

* * * * *